United States Patent
Yadav et al.

(10) Patent No.: US 12,360,858 B2
(45) Date of Patent: Jul. 15, 2025

(54) FILE SYSTEM INDEXING OF BACKUP SLICES FOR LARGE VIRTUAL MACHINES

(71) Applicant: Dell Products L.P., Round Rock, TX (US)

(72) Inventors: Sunil Yadav, Punjab (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 91 days.

(21) Appl. No.: 18/467,186

(22) Filed: Sep. 14, 2023

(65) Prior Publication Data

US 2025/0094290 A1    Mar. 20, 2025

(51) Int. Cl.
*G06F 11/14*    (2006.01)

(52) U.S. Cl.
CPC ...... *G06F 11/1464* (2013.01); *G06F 11/1435* (2013.01); *G06F 11/1461* (2013.01)

(58) Field of Classification Search
CPC ............. G06F 11/1464; G06F 11/1435; G06F 11/1461
USPC .......................................................... 714/6.3
See application file for complete search history.

(56) References Cited

U.S. PATENT DOCUMENTS 12,219,358 B2 * 2/2025 Saroiu ................. H04W 12/122

* cited by examiner

*Primary Examiner* — Yair Leibovich
(74) *Attorney, Agent, or Firm* — Chamberlain, Hrdlicka, White, Williams & Aughtry; Aly Z. Dossa

(57) ABSTRACT

A method for managing virtual machines includes obtaining a backup request for a full backup of a VM, in response to the backup request: performing a logical slicing of VM data associated with the VM to obtain a set of logical slices, storing the set of backup slices in a backup storage system, after storing the set of backup slices, obtaining backup metadata associated with the VM from the backup storage system, performing, using the backup metadata, a slice file system analysis on each backup slice of the set of backup slices associated with the VM to obtain file system information for a portion of VM data stored in each backup slice of the set of backup slices, and generating, from each backup slice associated with the full backup, a file indexing system for each backup slice in the set of backup slices using the file system information.

18 Claims, 16 Drawing Sheets

FILE SYSTEM INDEXING OF BACKUP SLICES FOR LARGE VIRTUAL MACHINES

BACKGROUND

Computing devices in a system may include any number of internal components such as processors, memory, and persistent storage. The storage of data across multiple computing devices may require significant use of such internal components. Providing instant access to data stored in a backup storage system may improve the overall operation of such computing devices.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
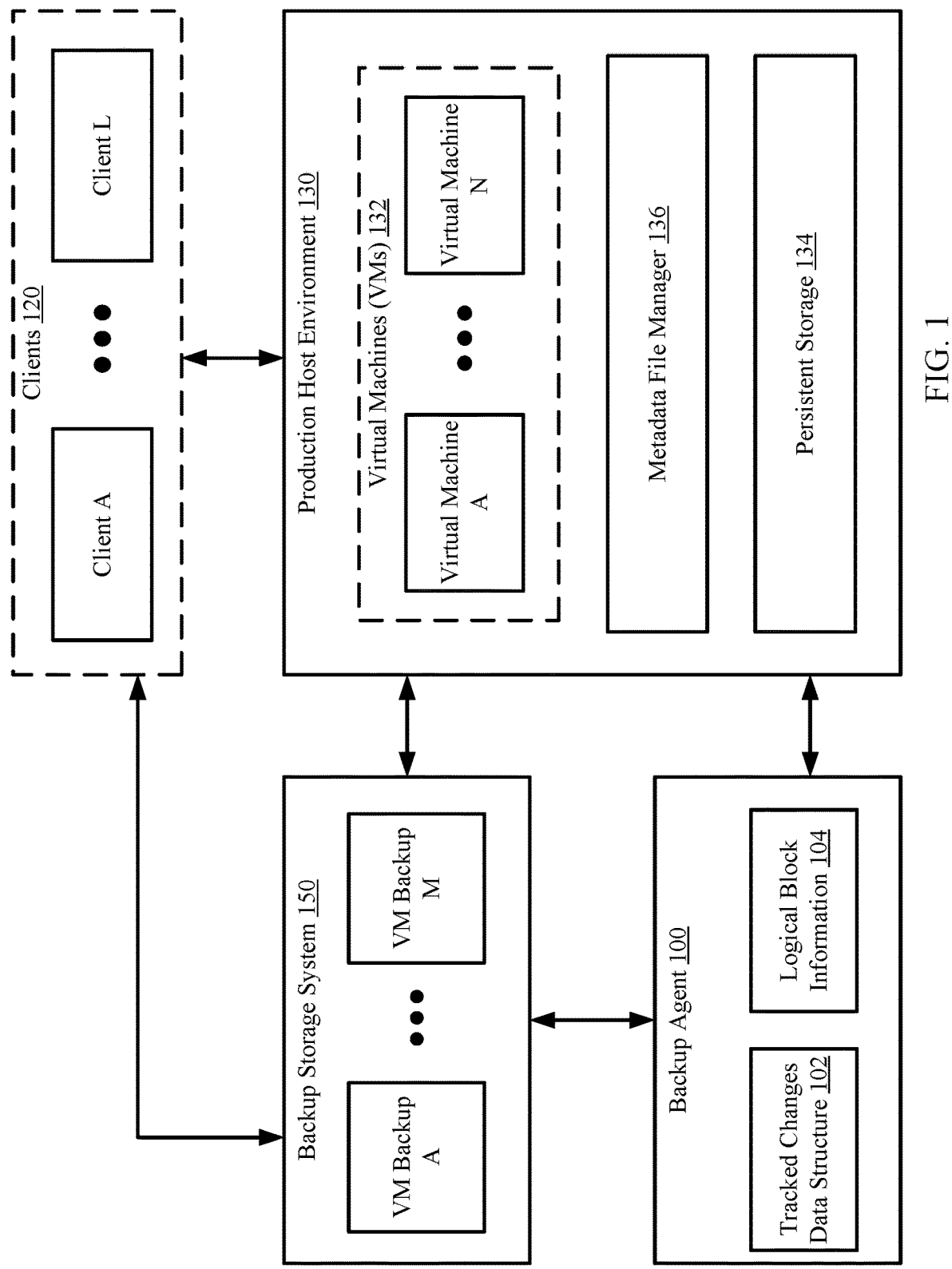
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing the access of data. Specifically, embodiments disclosed herein provide a method for generating backups of data in a file system without the requirement to crawl the file system. The file based backups may include a metadata file that may specify any useful metadata for instantly accessing the file data in the backup.

Further, embodiments disclosed herein include systems and methods for managing large virtual machines (VMs). Embodiments disclosed herein may provide an effective backup at scale. Specifically, embodiments disclosed herein may include a method for slicing large VMs. Such slicing may be a logical slicing (in contrast to the slicing of physical storage of VM data). The slicing may be based on the size of the virtual disk associated with the VM or based on the physical size of the VM data. Each slice, which is based on the physical size, may contain different virtual sizes of the VM data. For efficient post-backup operations such as incremental backups, enough metadata is maintained by the backup which may aid in effective performance of backup services. The method may further include sequencing of the slices with numbering in order provide virtual synthesis (both full and incremental) based on RCT (Resilient Change Tracking). The method may further include optionally recombining the slices on the backup storage system using the virtual synthesis.

Embodiments disclosed herein further include methods and systems for managing large virtual machines by providing a method for a more effective restoration of a backup of a large virtual machine. The method may include using restore streams which is not impacted by the number of files being restored. To meet the requirements of virtual machine systems, it may be requested for the restored file to retain its original shape post-restoration. For example, if a file is 10 TB at the time of backup, and it was sliced into 5 files (each 2 TB) during backup, after restoring the file on the VM environment, the VM file should be again 10 TB, not 5 files, otherwise the restored file(s) may not be readable in the VM environment. Traditional virtual synthesis post-data transfer from backup storage system to VM environment would require additional space and host resource. Embodiments disclosed herein use inline stitching (e.g., virtual synthesis) of multiple files into a single file.

Embodiments disclosed herein further include methods for mapping the RCT of VM backups to changed segments of data in the backup storage system. Such embodiments may reduce metadata overhead between the backup storage system storing the backups and the VM environment when tracking changed data of the backups. RCT may provide the changed blocks of a VM for use in generating incremental backups. These changed blocks could be of different sizes. The backup storage system may expect change blocks as multiplies of 8 kilobytes (KB). If a RCT data item has too many changes, virtual synthesis of this VM could create too much metadata overhead on the backup storage system and nullify the benefits and cost optimization for the user of the VM environment. Embodiments disclosed herein intelligently detect such gaps at the time of incremental backup and auto-adjust the block sizes so that these are aligned with DD segment sizes.

Embodiments disclosed herein further include systems and methods for instantly accessing data from large VM files using instant access techniques. The instant access techniques may include a method where a user requests instant access for a VM in the VM environment. An agent on the host may fetch the backup metadata for the selected VM backup. The backup metadata may include slices information. The agent (also referred to as a backup agent or production agent) may create a dummy virtual file of the size of original VM. Because these dummy virtual files are dynamic, minimal space is consumed for them. The agent mounts this dummy virtual file, creates a volume and formats it. The agent may then create another dynamic virtual file. The agent slices this internal virtual file (e.g., logically) and maps these slices to slices on the backup storage system. The agent may mount the outer virtual file (e.g., the second generated virtual file) using requests to a virtual file system manager and create a VM and passes the path of internal virtual file. During booting up of a VM, the agent receives request via its custom virtual file system manager. The virtual file system manager may look up map and fetch data from the backup storage system for mapped slice from the backup storage system.

Embodiments disclosed herein may include systems and methods for data compaction of VMs for efficient backup storage system and network utilizations. Embodiments disclose herein may provide a method for removing unused space in storage for backups of VMs. This may remove the resource consumption of the backup storage system. Embodiments disclosed herein leverage the concept of metadata-based backups. Such methods may include creating a VM checkpoint for backup in traditional implementation. The virtual file may be parsed to obtain the volume locator. The metadata of the file may further be parsed. The type of filesystem and the used block bitmap may be obtained. The used blocks may be mapped to physical file offsets and length. The virtual file block bitmap is obtained. This bitmap may be based on the used blocks from within the volume. A virtual file is created in the backup storage system, and the bitmap is transferred. The data offsets and length determined in the previous steps are sent as well. This results in virtual files like VM but transfer has not transferred the free blocks, thus providing a significant reduction in CPU, network and space usage.

Embodiments disclosed herein further include systems and methods for indexing VM data at scale for searching purposes in a cost-effective manner. Indexing of large VMs and enable search and file level restore from a large VM. The indexing may enable parallel indexing of a large VM file which may be made possible new techniques. The method may include creating a VM checkpoint for backup using traditional techniques. The backup agent may backup the large VM into multiple slices on the backup storage. The agent creates backup metadata with slices information. After generation of the backup, an indexing engine may retrieve the backup metadata from the backup storage system and read the slices info. Indexing engine may parse each slice for files and folders inside these and populate the data structure. Indexing engine start one thread for each slice. Slice info contains the underneath filesystem and location of data blocks.

FIG. 1 shows an example system in accordance with one or more embodiments of the invention. The system includes a backup agent (100), one or more clients (120), a production host environment (130) and a backup storage system (150). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the backup agent (100) manages backup operations of data in the production host environment (130). The backup operations may include generating, storing, and/or recovering VM backups stored in the backup storage system (150). In one or more embodiments of the invention, a VM backup is a backup of a virtual machine that includes VM data for a virtual disk operating in the production host environment (130). The VM backups may be backup slices (discussed in FIG. 2).

In one or more embodiments of the invention, the backup agent (100) further includes a tracked changes data structure (102). The tracked changes data structure (102) may be a data structure that specifies changes made to a virtual disk of a virtual machine (132) after a pre-defined period of time. The tracked changes data structure (102) may include the tracked changes for multiple VMs or for multiple periods of time without departing from the invention. The changes may be referred to as tracked changes. Each tracked change may be of different or identical sizes to each other without departing from the invention.

In one or more embodiments, the tracked changes data structure (102) is a resilient change tracking (RCT) data structure. The RCT data structure may be a file readable and written by hypervisors (not shown) of virtual machines executing in the production host environment (130). The RCT data structure may specify logical blocks of a VM that have changed during a given period of time. Each logical block may be of a pre-determined size. The RCT data structure may be used for the storage of VM backups in the backup storage system (150) in accordance with, e.g., FIGS. 5A-5B.

In one or more embodiments, the backup agent (100) stores logical block information (104) that includes additional information associated with the logical blocks and the corresponding data storage in the backup storage system (150). The logical block information may be a data structure that maps logical blocks in one or more virtual disks in the production host environment (130) to physical storage of corresponding data in the backup storage system (150). The logical block information (104) may be used for the backup storage, backup restoration, or backup instant access in accordance with, e.g., FIGS. 3A-8B.

Figure 9:
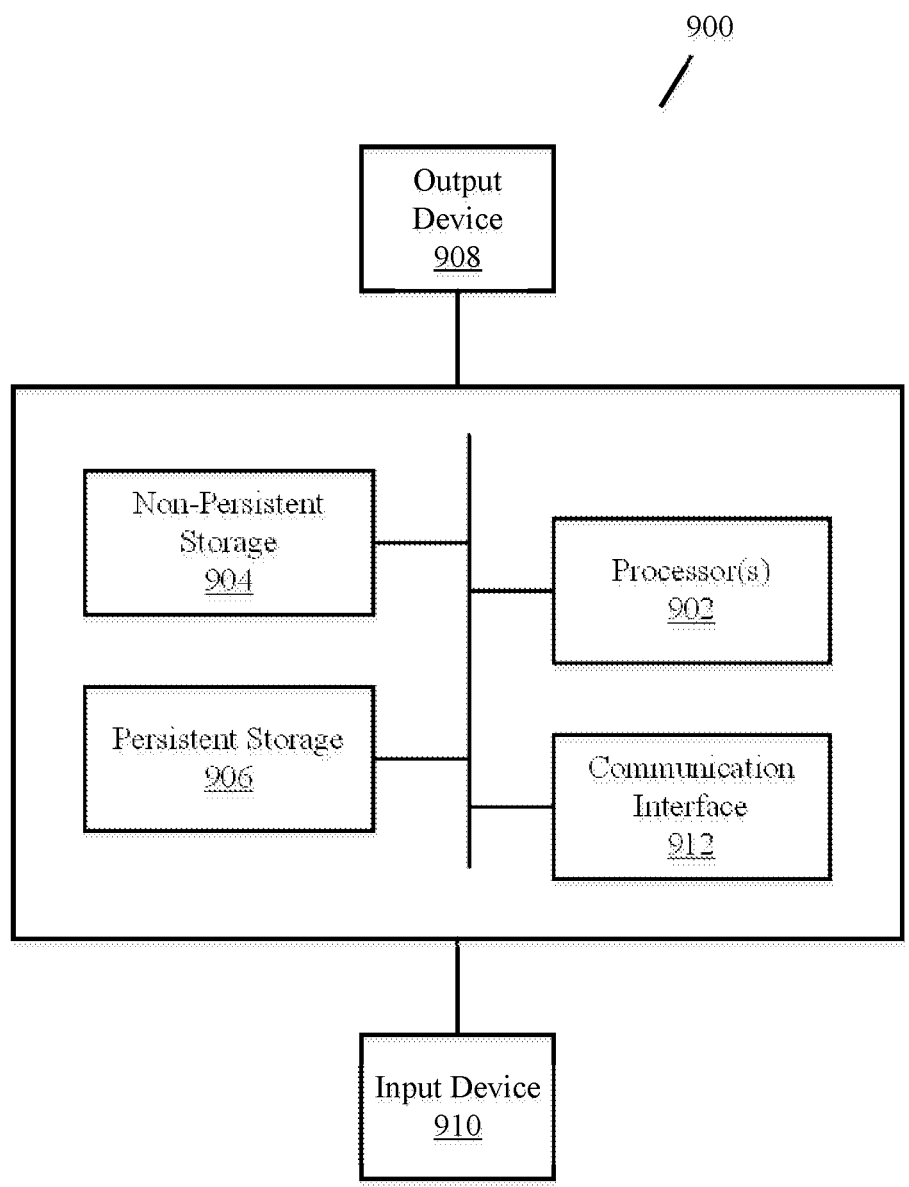
FIG. 9 shows a diagram of a computing device in accordance with one or more embodiments of the invention.

In one or more embodiments of the invention, the backup agent (100) is implemented as a computing device (see e.g., FIG. 9). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent (100) described throughout this disclosure.

In one or more embodiments of the invention, the backup agent (100) is implemented as a logical device. The logical device may utilize the computing resources of any number of computing devices and thereby provide the functionality of the backup agent (100) described throughout this disclosure.

While the backup agent (100) is illustrated in FIG. 1 as being a separate entity, the backup agent (100), and any components thereof, may be executed as part of the production host environment (130), the backup storage system (150), the clients (120), and/or any other entities without departing from the invention.

In one or more embodiments of the invention, the production host environment (130) hosts virtual machines (VMs) (132). The VMs (132) may be logical entities executed using computing resources (not shown) of the production host environment (130). Each of the VMs (132) may be performing similar or different processes. In one or more embodiments of the invention, the VMs (132) provide services to users, e.g., clients (not shown). For example, the VMs (132) may host components. The components may be, for example, instances of databases, email servers, and/or other components. The VMs (132) may host other types of components without departing from the invention.

In one or more embodiments of the invention, the VMs (132) generate VM data to be utilized for the servicing of the users. The VM data may be organized in a virtual disk in accordance with a file system. The file system may include any number of files organized into directories. For example, the directories may include paths for accessing the files. The file system may be stored in a container stored in the persistent storage (134) of the production host environment (130).

In one or more of embodiments of the invention, the VMs (132) are implemented as computer instructions, e.g., computer code, stored on a persistent storage (e.g., 134) that when executed by a processor(s) of the production host environment (130) cause the production host environment (130) to provide the functionality of the applications (132) described throughout this disclosure.

In one or more embodiments of the invention, the production host environment (130) further includes a metadata file manager (136). In one or more embodiments of the invention, the metadata file manager (136) obtains VM backup metadata files, obtains the relevant metadata attributes, and prepares instant access of VM backups stored in the backup storage system (150). The metadata file manager (136) may generate virtual disks by identifying a set of attributes for a selected or requested set of files in a VM backup and providing a mapping of the data in the selected requested set of files to the requesting applications (132). The mapping may be stored in the virtual file system (142). The metadata file manager (136) may generate the virtual file system (142) in accordance with, for example, the methods of FIGS. 3A-8A.

The metadata file manager (136) may further include functionality for generating a shared virtual disk (144). In one or more embodiments, the shared virtual disk (144) may include a copy of requested data from the backup storage system (150) to be accessible by instances of the applications (132). The shared virtual disk (144) may be written to or read from by multiple applications (132).

In one or more embodiments of the invention, the metadata file manager (136) is implemented as a computing device (see e.g., FIG. 9). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the metadata file manager (136) described throughout this disclosure and/or all, or a portion thereof, of the methods of FIGS. 3A-8A.

In one or more embodiments of the invention, the metadata file manager (136) is implemented as a logical device. The logical device may utilize the computing resources of any number of computing devices and thereby provide the functionality of the metadata file manager (136) described throughout this disclosure and/or all, or a portion thereof, of the methods of FIGS. 3A-8A.

While the metadata file manager (136) is illustrated in FIG. 1 as being a part of the production host environment (130), the metadata file manager (136), and any components thereof, may be executed as a separate entity or as part of the backup storage system (150), the clients (120), and/or any other entities without departing from the invention.

In one or more embodiments of the invention, the production host environment (130) is implemented as a computing device (see e.g., FIG. 9). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this disclosure.

In one or more embodiments of the invention, the production host environment (130) is implemented as a logical device. The logical device may utilize the computing resources of any number of computing devices and thereby provide the functionality of the production host environment (130) described throughout this disclosure.

In one or more embodiments of the invention, each of the backup storage systems (150) stores VM backups in its storage devices. The VM backups may be backups for virtual machines executing in the production host environment (130). The file systems may be based on files used by the applications (132). The FBBs may each correspond to a point in time of the file system. The FBBs may be used to restore the file system to such corresponding point in time. Each storage device may be a physical or logical partitioning of storage.

In one or more embodiments of the invention, the backup storage system (150) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this disclosure.

In one or more embodiments of the invention, the backup storage system (150) is implemented as a logical device. The logical device may utilize the computing resources of any number of computing devices and thereby provide the functionality of the backup storage system (150) described throughout this disclosure.

Figure 2:
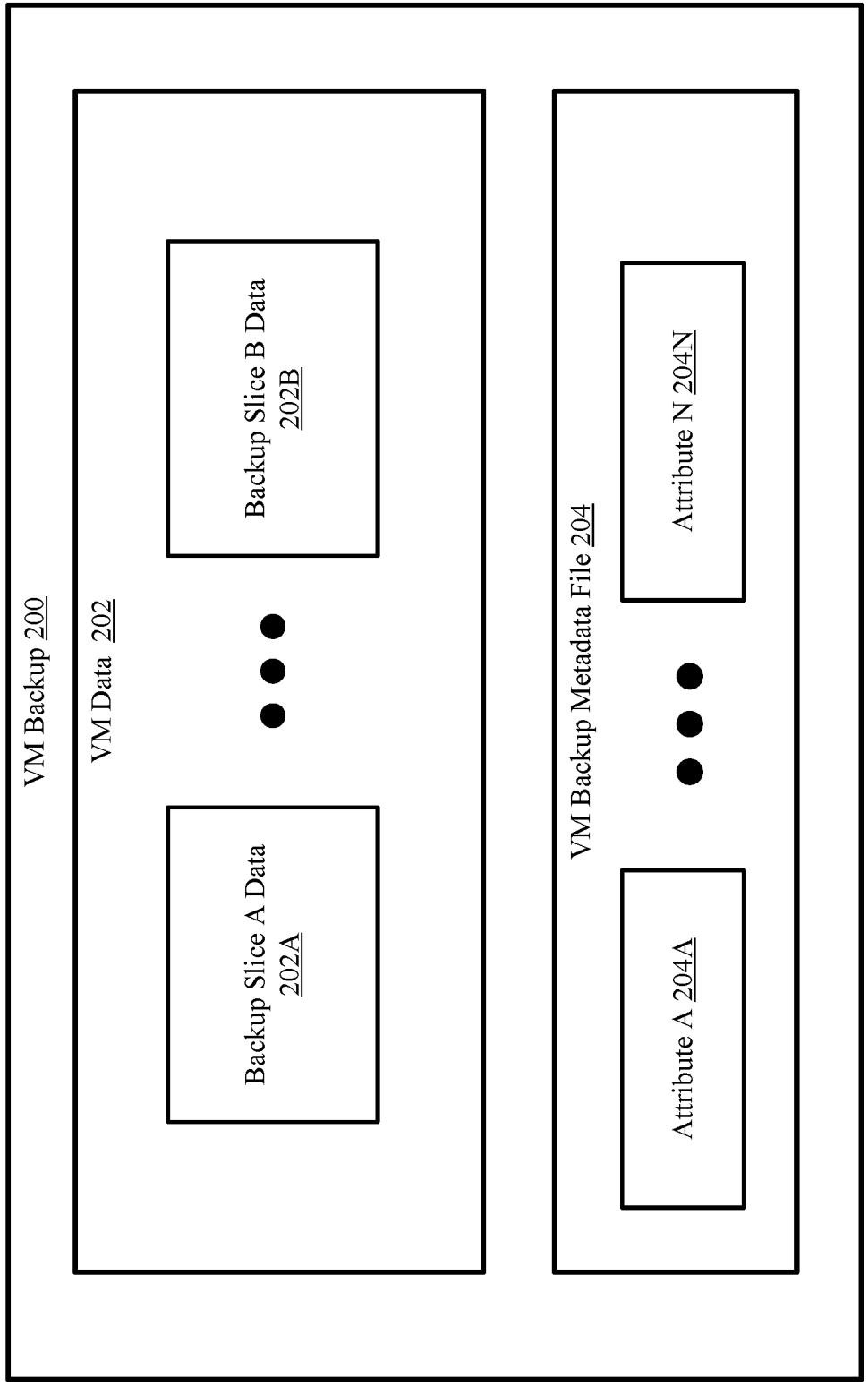
FIG. 2 shows a diagram of a virtual machine (VM) backup in accordance with one or more embodiments of the invention.

FIG. 2 shows a diagram of a VM backup without departing from the invention. The VM backup (200) may be an embodiment of a VM backup discussed in FIG. 1. As discussed above, the VM backup (200) is a data structure that includes the data of a virtual machine at a point in time. The VM backup (200) may include VM data (202) and a VM metadata file (204).

In one or more embodiments of the invention, the file system data includes data for one or more backup slices (202A, 202B). The data of each backup slice data (202A, 202B) may correspond to a logical slice (discussed throughout) of a virtual machine. The logical slice may be a logical partition of a virtual disk. The logical slices may be determined in accordance with FIG. 3A.

While the backup slices (202A, 202N) are illustrated in FIG. 2 as being a part of a VM backup (200), each backup slice (202A, 202N) may be stored independently from the other backup slices associated with the VM backup (200).

In one or more embodiments of the invention, the metadata file (204) is a data structure that includes metadata corresponding to the files in the file system data (202). The metadata may include attributes (204A, 204N) of a file and/or a data object of the VM backup (200). Each attribute may describe an aspect of a file. Examples of attributes (204A, 204N) include, but are not limited to: a data object (e.g., file) identifier, a parent file identifier, a container identifier, a data object size, a timestamp, a hash value of the data, a checksum value of the data, a header size, and an offset of the file in the backup storage system in which the file is stored.

In one or more embodiments of the invention, the attributes in the metadata file (204) are grouped into attribute regions. The attribute regions may be groupings of the metadata attributes. The attribute regions may be grouped based on a likelihood of an attribute changing between various iterations of a VM backup (e.g., 200).

For example, consider a scenario in which a first attribute (e.g., a file size) changes from a first iteration of a file system of a first VM backup to a second iteration of the file system of a second VM backup. In contrast, a second attribute (e.g., a file name) may remain the same between the two iterations of the file system. In such scenario, based on their likelihood to change in future iterations of the file system, the first attribute may correspond to a first attribute region, and the second attribute may correspond to a second attribute region.

FIGS. 3A, 3B, 4A, 5A, 6A, 7A, and 8A show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A, 3B, 4A, 5A, 6A, 7A, and 8A may be performed in parallel with any other steps shown in FIGS. 3A, 3B, 4A, 5A, 6A, 7A, and 8A without departing from the scope of the invention.

Following each flowchart is an example that describe use cases of various embodiments disclosed herein. The examples are illustrated in FIGS. 3C, 4B, 5B, 6B, 7B, and 8B. The examples are not intended to limit the invention and is independent from any other examples discussed in this disclosure. Each example illustrated in FIGS. 3C, 4B, 5B, 6B, 7B, and 8B may illustrate a set of actions performed by one or more components of the system illustrated in FIGS. 3C, 4B, 5B, 6B, 7B, and 8B.

Figure 3A:
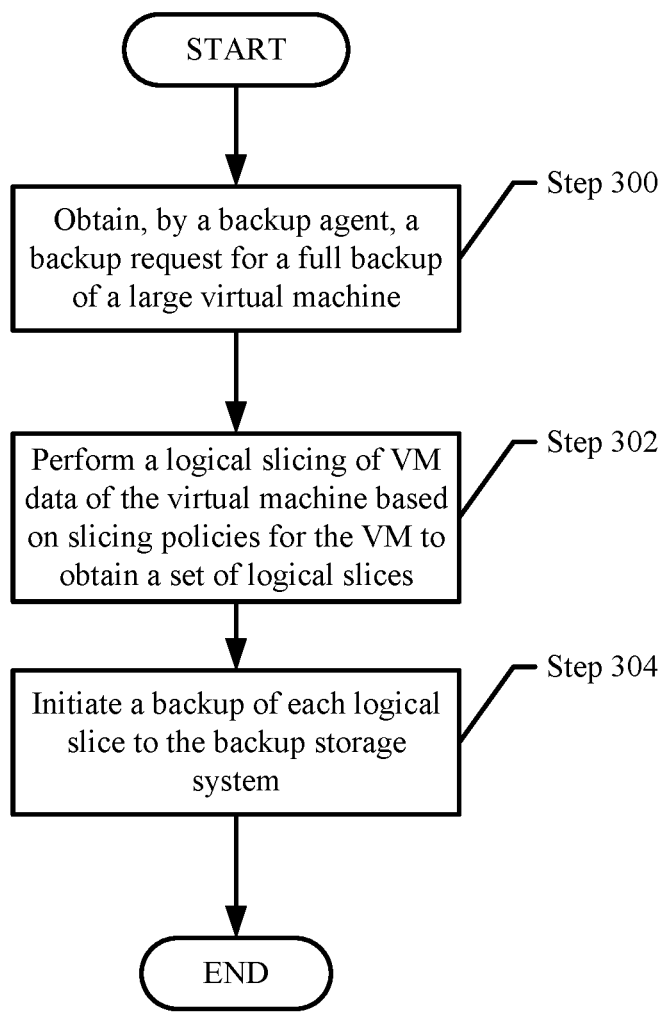
FIG. 3A shows a flowchart for storage of a full backup in accordance with one or more embodiments of the invention.

FIG. 3A shows a flowchart for storage of a full backup in accordance with one or more embodiments of the invention. The method shown in FIG. 3A may be performed by, for example, a backup agent (e.g., 100, FIG. 1). Other components of the system illustrated in FIG. 1 may perform the method of FIG. 3A without departing from the invention.

In step 300, a backup request is received for a backup of a virtual machine (VM). In one or more embodiments, the backup request specifies the VM that is to be backed up. The backup request may be obtained from a client (e.g., 120, FIG. 1). The VM backup to be generated may be a full backup. In one or more embodiments, a full backup is a VM backup that includes all VM data of a virtual disk. In contrast, a virtual synthetic backup (further discussed below in FIG. 3B) describes a VM backup that includes partial VM data. The partial VM data may be data that was changed after the generation of a previous backup (e.g., a full backup or another virtual synthetic backup). In one or more embodiments, the VM data of a virtual disk is of a large size. The large size may be, for example, greater than 200 gigabytes (GB).

In step 302, a logical slicing of VM data associated with the VM is performed based on slicing policies to obtain a set of logical slices. In one or more embodiments, the logical slicing a partitioning of data into a set of partitioned portions (e.g., logical slices) of the VM data such that the set of partitioned portions, collectively, comprise the VM data. In one or more embodiments, each logical slice is associated with a portion of the VM data.

In one or more embodiments, the partitioned portions are determined based on slicing policies. In one or more embodiments, the slicing policies may specify a policy (or policies) for determining: (i) a number of logical slices, and/or (ii) a size of each logical slice. This determining may be performed based on a size of the VM data. In one example, the determined number of slices may be proportional to the size of the VM data. In another example, the size of the logical slices may be proportional to the size of the VM data. In another example, the determined number of logical slices is proportional to a criticality of the VM.

In step 304, a backup of each logical slice is initiated and/or performed. In one or more embodiments, the backup of a logical slice is performed by generating a copy of the portion of VM data corresponding to the logical slice, initiating a backup stream to store the generated copy in the backup storage system as a backup slice, and generating and storing a backup metadata file associated with the backup slice. The backup metadata file may be stored in the backup storage system. The backup may be performed for each logical slice obtained in step 302.

While not illustrated in FIG. 3A, the backup slices stored in the backup storage system may be synthesized (i.e., combined) to be a single file of the VM backup. The single file may be stored in the backup storage system.

Figure 3B:
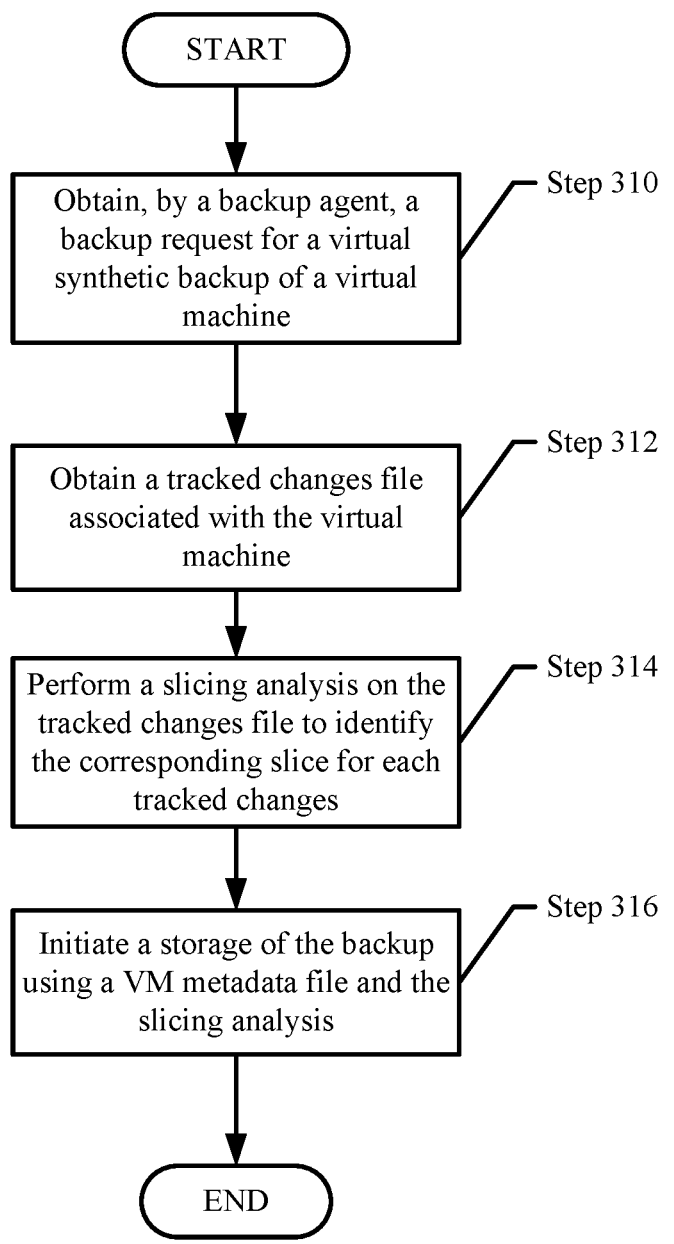
FIG. 3B shows a flowchart for storage of a virtual synthetic backup in accordance with one or more embodiments of the invention.

FIG. 3B shows a flowchart for storage of a virtual synthetic backup in accordance with one or more embodiments of the invention. The method shown in FIG. 3B may be performed by, for example, a backup agent (e.g., 100, FIG. 1). Other components of the system illustrated in FIG. 1 may perform the method of FIG. 3B without departing from the invention.

In step 310, a backup request is obtained for a virtual synthetic backup of a VM. In one or more embodiments, a virtual synthetic backup refers to a backup that includes a data that depends on the data of a second, previously-generated backup for the restoration of the VM to a predefined point in time. The virtual synthetic backup may include a fast copy of the previous backup (i.e., the second, previously-generated backup) and a set of tracked changes to the VM during a period of time after the generation of the previous backup. In one or more embodiments, a fast copy is a pointer (or other reference) to the previous backup. The previous backup may be a backup generated in accordance with FIG. 3A. An example of a virtual synthetic backup may be, for example, an incremental backup (discussed below in FIGS. 5A-5B).

In step 312, a tracked changes file is obtained. In one or more embodiments, the tracked changes file (also referred to as a tracked change data structure) is a data structure that specifies the changes made to a virtual disk after a predefined point in time. The predefined point in time may be the point in which a previous backup is generated. The changes specified in the tracked changes file may be of similar or different sizes to each other without departing from the invention.

In step 314, a slicing analysis is performed on the tracked changes file to identify corresponding slices for each tracked changes. In one or more embodiments, the slicing analysis includes using logical block information, or other data structures, to identify a slice associated with each change in the tracked changes file. The slice corresponding to a given change may be determined based on the logical slice corresponding to data that the given change is tracking.

In step 316, storage of the backup (i.e., the virtual synthetic backup) is initiated using a VM metadata file and the slicing analysis. In one or more embodiments, the virtual synthetic backup is generated by storing a copy of the tracked changes, a copy of metadata of the tracked changes (e.g., the corresponding logical slice of each tracked change), and a fast copy of the previous backup.

In one or more embodiments, the virtual synthetic backup is stored as backup slices, where each backup slice corresponds to a portion of the tracked changes backed up for the virtual synthetic backup. The portion of the tracked changes may be grouped based on the corresponding logical slices. The virtual synthetic backup may further include the fast copy of the previous backup.

Example 1

Figure 3C:
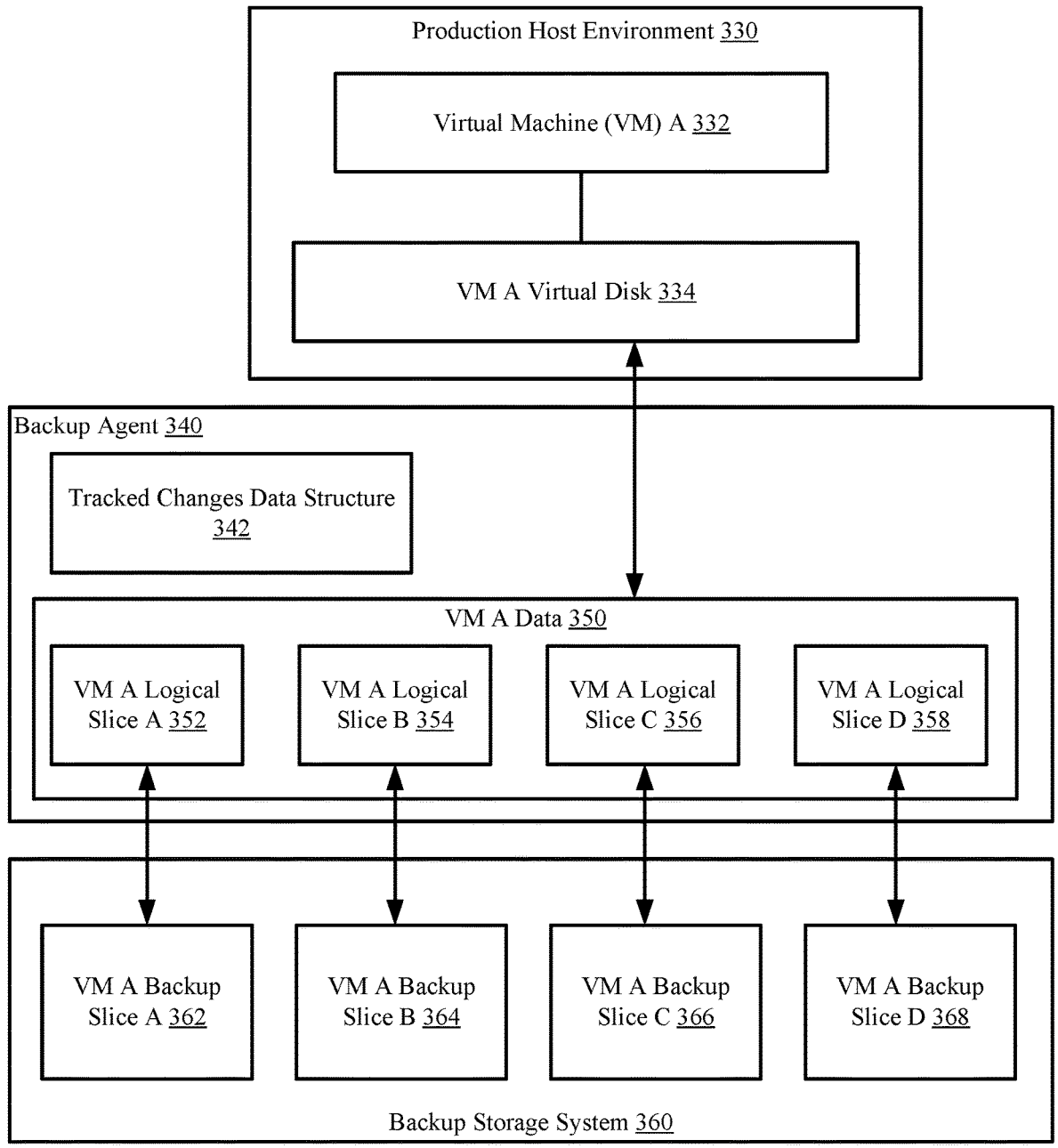
FIG. 3C shows a diagram of a first example in accordance with one or more embodiments of the invention.

The following section describes a first example illustrated using FIG. 3C. The first example may include embodiments described in FIGS. 3A-3B. Turning to the first example, consider a scenario in which a backup of a virtual machine is to be performed.

FIG. 3C shows a diagram of an example system. The example system includes the backup storage system (360), a backup agent (340), and a production host environment (330). For the sake of brevity, not all components of the example system are illustrated in FIG. 3C. The production host environment (330) includes virtual machine (VM) A (332) that is a guest operating system operating using a virtual disk (334). A client (not shown) sends a first backup request to the backup agent (340) for a full backup of VM A (332).

The backup agent (340), in response to the first backup request, performs a logical slicing in accordance with FIG. 3A of the VM data associated with the VM A virtual disk (334). The VM data (350) may be partitioned into VM A logical slices A (352), B (354), C (356), and D (358). Each of the VM A logical slices (352, 354, 356, 358) may correspond to a portion of the VM data (350) of the VM A virtual disk (334). A backup of each logical slice (352, 354, 356, 358) may be performed to generate a set of backup slices (362, 364, 366, 368).

VM A backup slice A (362) is a VM backup of the portion of VM data associated with VM A logical slice A (352); backup slice B (364) is a VM backup of the portion of VM data associated with VM A logical slice B (354); backup slice C (366) is a VM backup of the portion of VM data associated with VM A logical slice C (356); and backup slice D (368) is a VM backup of the portion of VM data associated with VM A logical slice D (358).

At a second point in time, a second backup request is sent for the backup of the VM at the second point in time. The second backup request may specify a virtual synthetic backup that depends on the backup generated above. In response to the second backup request, the backup agent may use a tracked changes data structure (342) to perform the method of FIG. 3B to generate a virtual synthetic backup. The virtual synthetic backup includes the VM backup metadata that associates each tracked change in the tracked changes data structure to the corresponding logical slice (352, 354, 356, 358) and store the VM backup metadata with the virtual syntethic backup (not shown) in the backup storage system (360).

End of Example 1

Figure 4A:
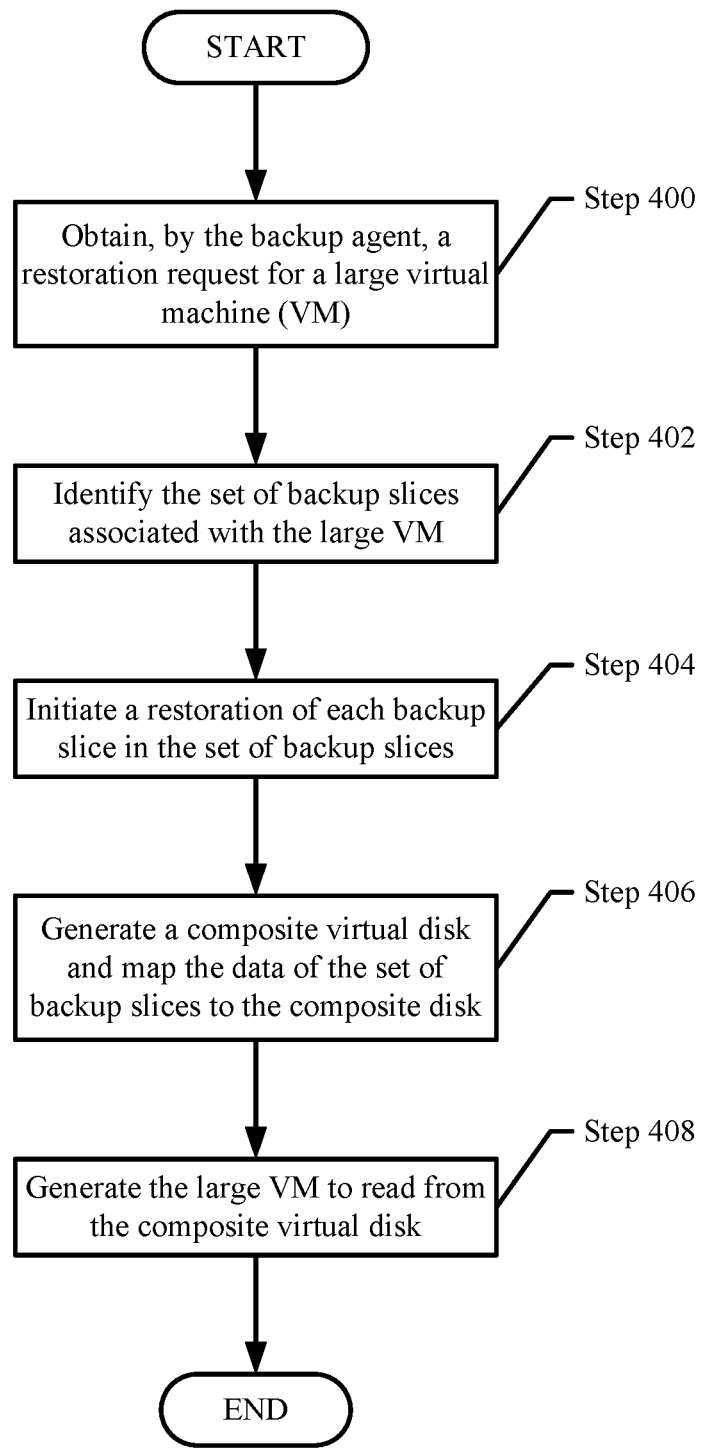
FIG. 4A shows a flowchart for restoration of a backup in accordance with one or more embodiments of the invention.

FIG. 4A shows a flowchart for restoration of a backup in accordance with one or more embodiments of the invention. The method shown in FIG. 4A may be performed by, for example, a backup agent (e.g., 100, FIG. 1). Other components of the system illustrated in FIG. 1 may perform the method of FIG. 4A without departing from the invention.

Figure 5A:
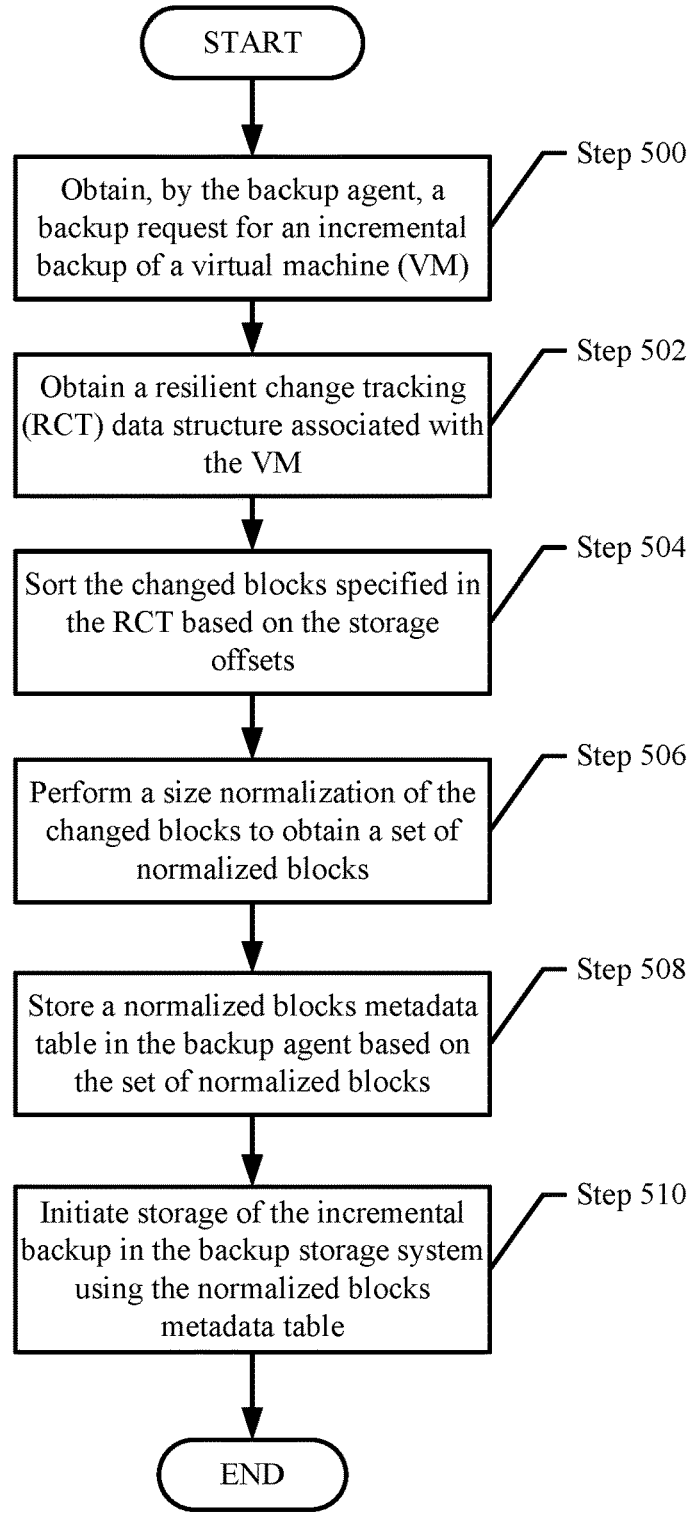
FIG. 5A shows a flowchart for storing an incremental backup using a resilient change tracking (RCT) data structure in accordance with one or more embodiments of the invention.

In one or more embodiments, the tracked changes file is in a format that is inefficient when stored in the backup storage system. For example, a resilient change tracking (RCT) data structure may be in a format that requires high amounts of storage resources for metadata storage at the backup storage system level. FIG. 5A includes a method for storage of incremental backups while reducing the metadata storage at the backup storage system level compared to, e.g., the method described in FIG. 3B.

In step 400, a restoration request is obtained for a virtual machine. In one or more embodiments, the restoration request specifies the restoration of a backup of large virtual machine. The VM backup may be one generated in accordance with FIGS. 3A or 3B.

In step 402, the set of backup slices associated with the large VM is identified. The set of backup slices may describe a collection of backup slices, stored in the backup storage system, that collectively comprise the VM data of a virtual disk of the VM to be restored. The set of backup slices may be identified using at least one VM backup metadata file of the requested VM backup. The VM backup metadata file may be obtained from the backup storage system.

In step 404, a restoration of each backup slice is initiated. In one or more embodiments, the restoration of a backup slice includes initiating a backup stream for the backup slice, initiating a transfer of the data in the backup slice to the production host environment in which the restored VM is to be executed.

In step 406, a composite virtual disk is generated. In one or more embodiments, the composite virtual disk is generated by reserving a portion of the persistent storage of the production host environment for the storage of the data transferred from the set of backup streams identified in step 402. In one or more embodiments, the composite virtual disk may include a logical partitioning of logical slices, where each logical slice corresponds to the data of one of the set of backup slices. In this manner, collectively, the logical slices correspond to the data of all of the set of backup slices transferred during the restoration(s) of step 404. The composite virtual disk may be one file that maps the data of all of the logical slices, and as such, maps the VM data of the VM backup associated with the large VM to be restored.

In step 408, the large VM is generated and instructed to read from the composite virtual disk. In one or more embodiments, the large VM is generated by booting up a guest operating system and directing the guest operating system to read from the composite virtual disk. In one or more embodiments of the invention, the access includes establishing the organization of the shared virtual disk so that each virtual machine may send read requests and write requests for the data (e.g., one or more files) in the composite virtual disk. The entity servicing the read and/or write request (e.g., a driver in the production host environment) may utilize the composite virtual disk to identify the file(s), the storage location of the data corresponding to the file(s), and obtain the specified data. In this manner, the requested large VM to be restored is executed using the large VM generated in step 408.

Example 2

Figure 4B:
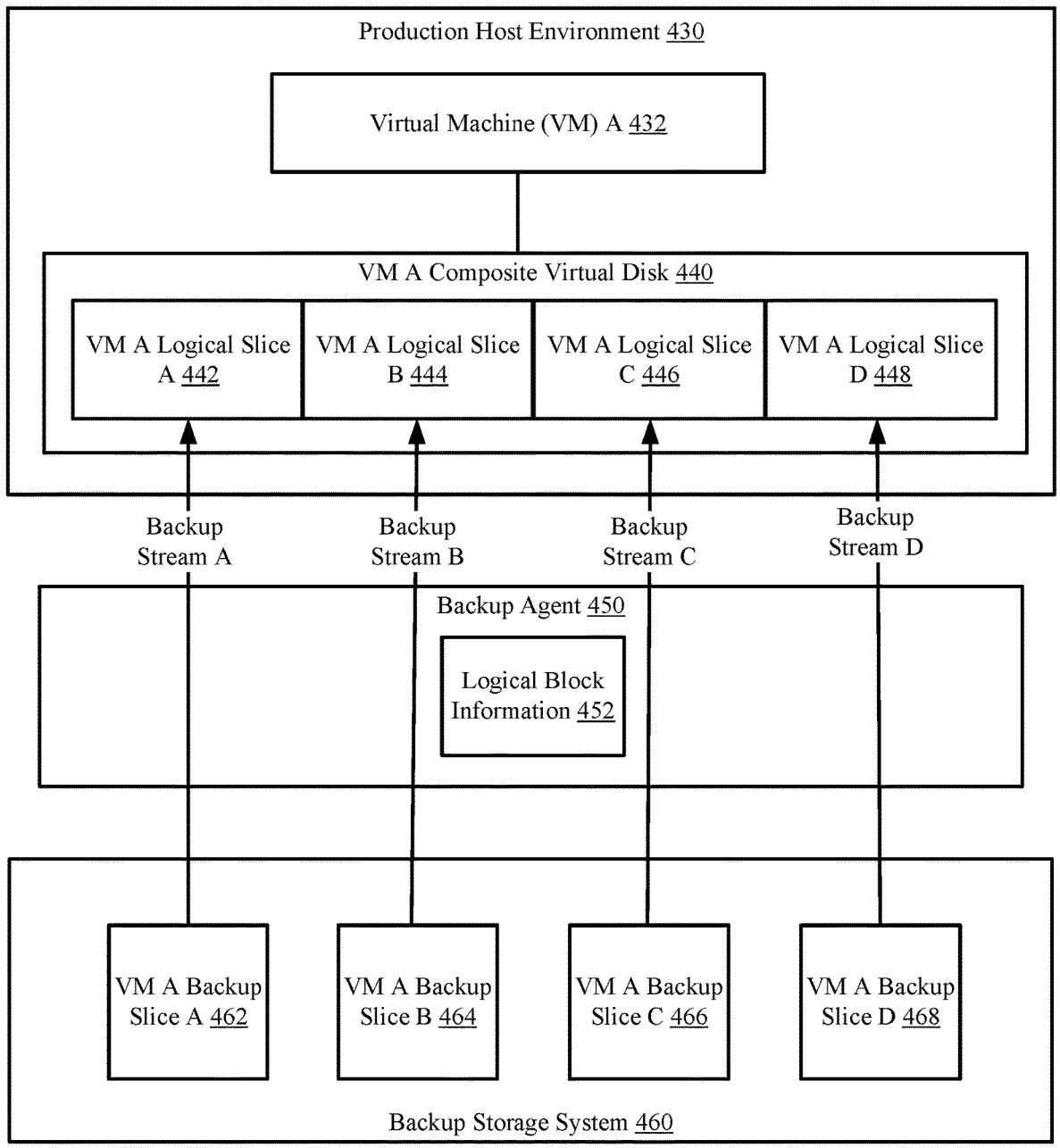
FIG. 4B shows a diagram of a second example in accordance with one or more embodiments of the invention.

The following section describes a second example illustrated using FIG. 4B. The second example may include embodiments described in FIG. 4A. Turning to the second example, consider a scenario in which a backup of a virtual machine is to be restored to a production host environment.

FIG. 4B shows a diagram of an example system. The example system includes the backup storage system (460), a backup agent (450), and a production host environment (430). For the sake of brevity, not all components of the example system are illustrated in FIG. 4B. A client (not shown) sends a restoration request to the backup agent (340) for a restoration of a backup of VM A (432) to a specified point in time.

The backup agent (450), in response to the restoration request, generates a VM A composite virtual disk (440) by reserving persistent storage (not shown) of the production host environment (430) for the execution of VM A (432). The backup agent (450) further identifies a set of backup slices associated with the VM backup to be restored. The backup agent identifies VM A backup slice A (462), VM A backup slice B (464), VM A backup slice C (466), and VM A backup slice D (468), all stored in the backup storage system (460), as the four backup slices associated with the VM data of VM A (432) at the specified point in time.

After identifying the four backup slices (462, 464, 466, 468), the backup agent (450) initiates a restoration of each of the backup slices (462, 464, 466, 468) by providing a backup stream to each backup slice (462, 464, 466, 468) and transmitting the portion of the VM data in the backup slices (462, 464, 466, 468) to the production host environment (430) via the corresponding backup stream. Backup stream A is used to transmit the data of backup slice A (462); backup stream B is used to transmit the data of backup slice B (464); backup stream C is used to transmit the data of backup slice C (466); and backup stream D is used to transmit the data of backup slice D (468).

The transmission is performed using logical block information (452) of the backup agent (450) that maps each data block in a backup slice (462, 464, 466, 468) to a logical block of a logical slice (442, 444, 446, 448) of the VM A composite virtual disk (440).

After the completion of the restoration of each of the backup slices (462, 464, 466, 468), the VM A composite virtual disk (440) maps to all of the VM data of the four backup slices (462, 464, 466, 468) that is transmitted to the persistent storage. VM A (432), following this, executes using the composite virtual disk (440). In this manner, VM A operates using one file (i.e., the VM A composite virtual disk (440)) that includes data obtained from four separate files (i.e., the backup slices (462, 464, 466, 468)).

End of Example 2

FIG. 5A shows a flowchart for storing an incremental backup using a resilient change tracking (RCT) data structure in accordance with one or more embodiments of the invention. The method shown in FIG. 5A may be performed by, for example, a backup agent (e.g., 100, FIG. 1). Other components of the system illustrated in FIG. 1 may perform the method of FIG. 5A without departing from the invention.

In step 500, a backup request is performed for an incremental backup of a VM. In one or more embodiments, the incremental backup refers to a VM backup that is depends on another VM backup for a full restoration of the VM to a given point in time. The incremental backup may be an example of a virtual synthetic backup described throughout this disclosure.

In one or more embodiments, the backup request of FIG. 5A specifies a reduced storage of backup metadata in the backup storage system. This may differ from a backup request as described in FIG. 3B for a virtual synthetic backup. Specifically, the backup request described in FIG. 3B does not specify any reduced storage of backup metadata in the backup storage system.

Returning to FIG. 5A, in step 502, a resilient change tracking (RCT) data structure associated with the VM is obtained. In one or more embodiments, the RCT data structure is a type of tracked changes data structure that is generated by components of the production host environment in which the VM operates. The components may provide the RCT data structure to the backup agent.

In step 504, the changed blocks specified in the RCT are sorted based on the storage offsets in the virtual disk. In one or more embodiments, the changed blocks may include tracked changes of the VM during a pre-defined period of time. The tracked changes may be in a format such that each tracked change includes a segment defining contiguous set of changed blocks. The segment may be defined using an offset of the virtual disk and a size of the segment. These segments may be sorted based on the defining offsets.

In step 506, a size normalization of the changed blocks is performed to obtain a set of normalized blocks. In one or more embodiments, the tracked changes may include changed blocks. Each changed block may be of a size that is not compatible with the storage of data blocks of the VM backups.

To remediate the incompatibility, in step 508, the backup agent generates and stores a normalized block metadata table. The normalized block metadata table may be a portion of the logical block information (e.g., 104, FIG. 1) discussed above. The normalized block metadata table may include a set of normalized blocks that are of a size that is compatible with the data blocks stored in the backup storage system. Each normalized block may correspond to a portion of data specified in the tracked changes. For example, the changed blocks may be grouped into the normalized blocks such that the size of the normalized blocks are standardized. For each tracked change that is of a size smaller than the standardized size, the corresponding normalized block may correspond to the data of such tracked change and additionally, any empty data required to complete the normalized block to the standardized size. The normalized block metadata table may specify a mapping between each normalized block and the corresponding change block(s).

In step 510, storage of the incremental backup in the backup storage system is initiated using the normalized blocks metadata table. In one or more embodiments, the storage includes generating a copy of data specified in each of the set of normalized blocks and transmitting the data to the backup storage system collectively as a VM backup. The data may be of the normalized blocks in the standardized size. In this manner, the backup storage system stores data in a standardized size that is compatible with the storage of VM backups in the backup storage system.

In one or more embodiments, the incremental backup is dependent on another VM backup stored in the backup storage system. The metadata tracking this dependency (e.g., for restoration purposes) may be stored in the backup agent or as part of the incremental backup in the backup storage system without departing from the invention.

In one or more embodiments, the incremental backup is stored as backup slices, where each backup slice corresponds to a portion of the set of normalized blocks. The portion of the set of normalized blocks may be grouped based on the corresponding logical slices. The virtual synthetic backup may further include the fast copy of the previous backup.

Example 3

Figure 5B:
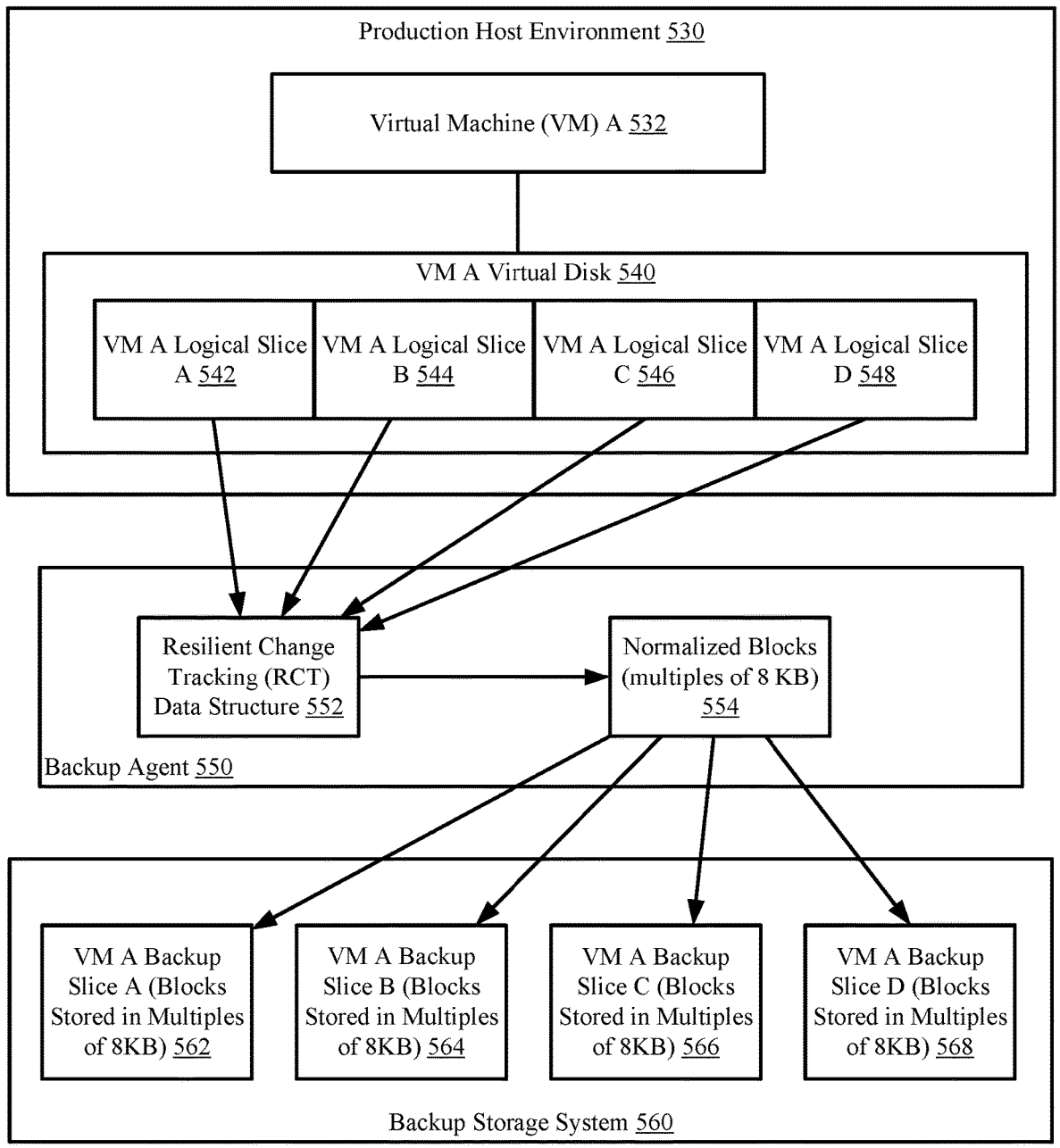
FIG. 5B shows a diagram of a third example in accordance with one or more embodiments of the invention.

The following section describes a third example illustrated using FIG. 5B. The third example may include embodiments described in FIG. 5A. Turning to the third example, consider a scenario in which an incremental backup of a virtual machine is to be generated and stored in a backup storage system.

FIG. 5B shows a diagram of an example system. The example system includes the backup storage system (560), a backup agent (550), and a production host environment (530). For the sake of brevity, not all components of the example system are illustrated in FIG. 5B. A client (not shown) sends a backup request to the backup agent (550) for an incremental backup of a backup of VM A for a period of time after the generation of a previous backup (not shown).

The backup agent (550), in response to the backup request, obtains a RCT data structure (552) that corresponds to tracked changes to data of VM A virtual disk (540) of VM A (532). The tracked changes in the RCT data structure (552) are each associated with one of four VM A logical slices (542, 544, 546, 548) of the VM A virtual disk (540). Each tracked change may be of a size that is not compatible to the storage of data in the backup storage system. Specifically, not all tracked changes may be divisible into data blocks of 8 KB in size. In this example, it may be preferable to store data in the backup storage system (560) in data blocks of a size divisible by 8 KB.

To service this preference, after obtaining the RCT data structure (552), the backup agent (550) generates a set of normalized blocks (554) in accordance with FIG. 5A. The set of normalized blocks (554) may include the tracked changes that are standardized so that their respective sizes are of multiples of 8 KB. Such standardization may include grouping the change blocks of the tracked changes into groups in sizes of a multiple of 8 KB. A normalized block metadata table is stored in the backup agent (550). The normalized block metadata table maps the set of normalized blocks to the tracked changes specified in the RCT data structure.

After the set of normalized blocks (554) are generated, the backup agent (550) initiates a generation of the incremental backup by storing the data corresponding to the normalized blocks (554) in the backup storage system (560). Similar to the tracked changes, each of the normalized blocks (554) corresponds to a logical slice (542, 544, 546, 548). As such, the incremental backup is stored as a set of backup slices (562, 564, 566, 568).

Specifically, VM A backup slice A (562) includes the portion of the set of normalized blocks associated with tracked changes to data of VM A logical slice A (542); backup slice B (564) includes the portion of the set of normalized blocks associated with tracked changes to data of VM A logical slice B (544); backup slice C (566) includes the portion of the set of normalized blocks associated with tracked changes to data of VM A logical slice C (546); and backup slice D (568) includes the portion of the set of normalized blocks associated with tracked changes to data of VM A logical slice D (548).

End of Example 3

Figure 6A:
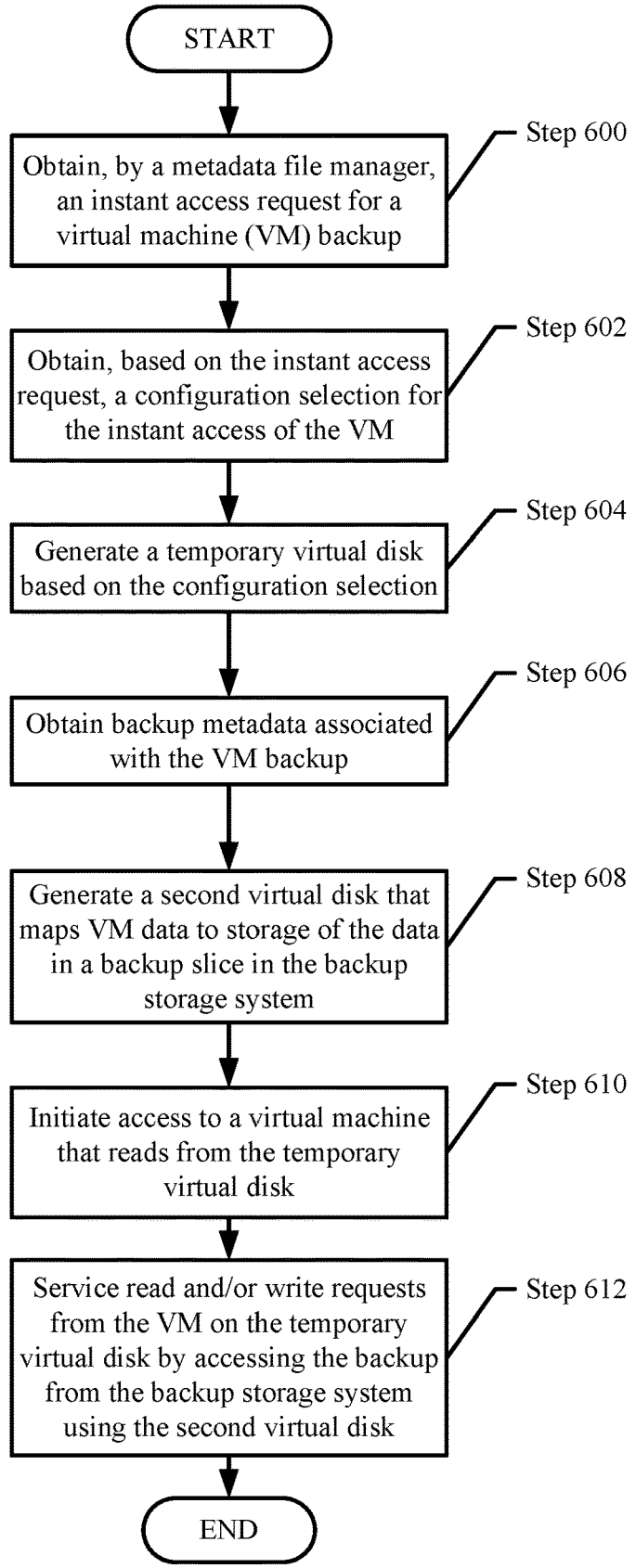
FIG. 6A shows a flowchart for providing instant access to a backup of a virtual machine in accordance with one or more embodiments of the invention.

FIG. 6A shows a flowchart for providing instant access to a backup of a virtual machine in accordance with one or more embodiments of the invention. The method shown in FIG. 6A may be performed by, for example, a metadata file manager (e.g., 136, FIG. 1). Other components of the system illustrated in FIG. 1 may perform the method of FIG. 6A without departing from the invention.

In step 600, an instant access request for a VM backup is obtained. In one or more embodiments of the invention, the instant access request specifies mounting a virtual disk of at least a portion of the VM backup in the production host environment such that the VM has access to the data (e.g., files) in the VM backup. The instant access request may specify the point in time associated with the VM. The instant access request may be obtained from a client operated by a user.

In step 602, a configuration selection is obtained for the instant access of the VM. In one or more embodiments, the configuration selection specifies a condition for terminating the VM. For example, the condition may be a request limit. The request limit may specify a number of total requests (e.g., write request and/or read request) to be serviced for the VM before the VM is terminated. In another example, the condition may be a time limit. The VM may be terminated after the time limit elapses. In one or more embodiments, the configuration selection further specifies the backup agent to be used for the instant access, the production host in which the VM is to be accessed, and/or any other configuration without departing from the invention.

In step 604, a temporary virtual disk is generated based on the configuration selection. In one or more embodiments, the temporary virtual disk is generated by reserving a portion of the persistent storage of the production host environment for the access of data in the VM backup. The temporary virtual disk may be terminated in accordance with the configuration selection.

In step 606, a backup metadata associated with the VM backup is obtained. The backup metadata may include one or more VM metadata files. The backup metadata may be obtained from the backup storage system.

In step 608, a second virtual disk is generated that maps VM data to storage of the data in a backup slice in the backup storage system. In one or more embodiments, the second virtual disk may include a set of logical blocks that are each associated with a data block of the VM backup. Collectively, the set of logical blocks may map to the VM data of the virtual disk to be accessed in the production host environment.

In step 610, access to a virtual machine that reads from the temporary virtual disk is initiated.

In step 612, read requests and write requests, obtained from the VM on the temporary virtual disk, are serviced by accessing the VM backup from the backup storage system using the second virtual disk. In one or more embodiments of the invention, the access to the FBB virtual file system may include obtaining read requests and/or write requests for file data in the VM backup. The file data may include files. The entity (e.g., the metadata file manager) managing the second virtual disk may identify a file path corresponding to the requested data. The file path may specify the portions of data corresponding to the requested files. The portions of data may be mapped by the second virtual disk to the corresponding storage locations in the backup storage system. Based on the identified file path and storage locations, the requested data may be obtained from the backup storage system. For example, a copy of the requested data may be generated and provided to the VM.

In one or more embodiments, a termination of the VM is initiated after a condition of the configuration selection is met. In one or more embodiments, the metadata file manager performs the termination by dismounting the virtual disk such that the virtual disk no longer provides access to any application or VM. In this manner, the VM and the virtual disk no longer take up processing or other resources of the production host environment, nor do they provide their respective functionality.

Example 4

Figure 6B:
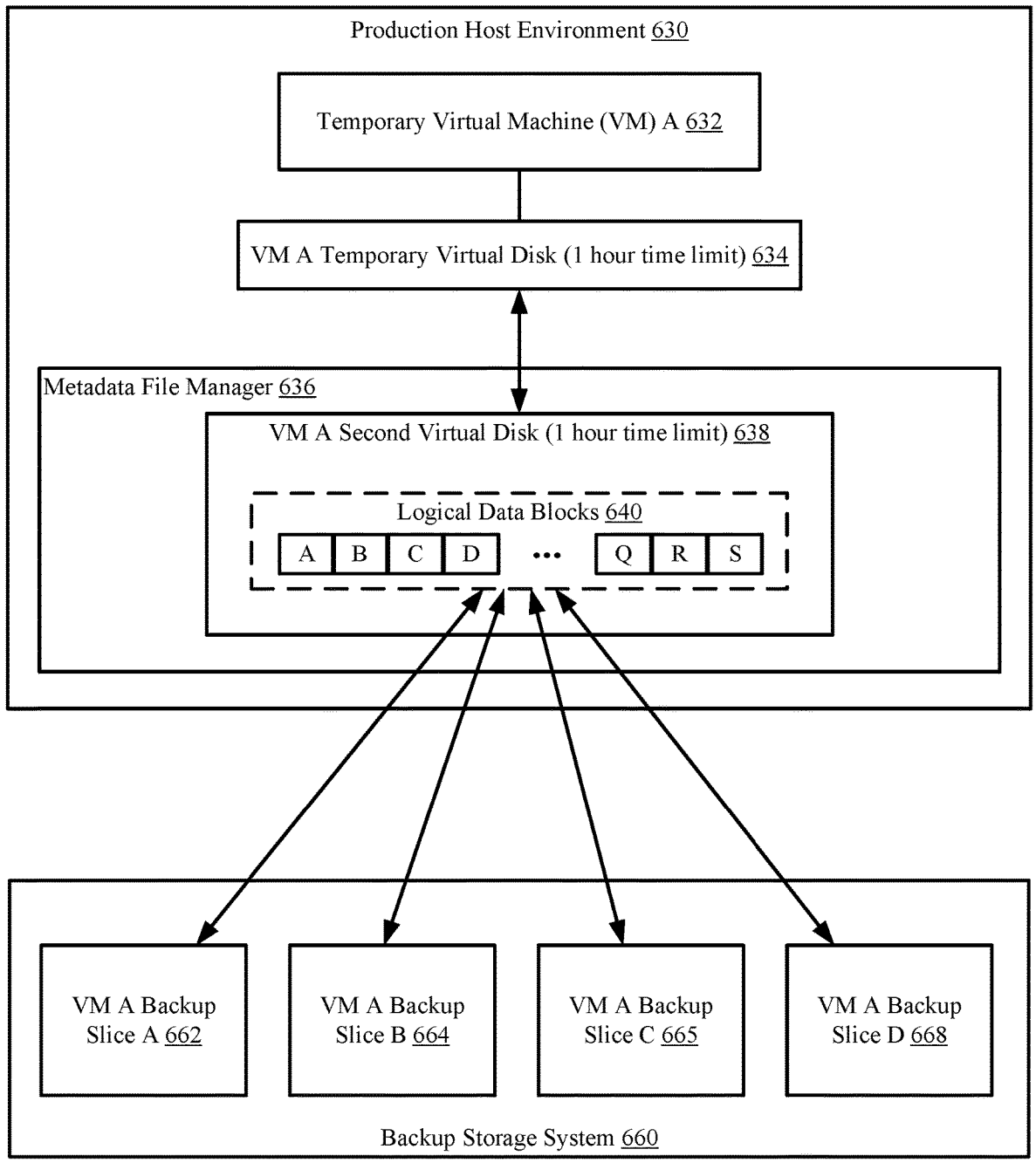
FIG. 6B shows a diagram of a fourth example in accordance with one or more embodiments of the invention.

The following section describes a fourth example illustrated using FIG. 6B. The fourth example may include embodiments described in FIG. 6A. Turning to the fourth example, consider a scenario in which a backup of a virtual machine is to be accessed by a VM in a production host environment from a backup storage system.

FIG. 6B shows a diagram of an example system. The example system includes the backup storage system (660) and a production host environment (630). For the sake of brevity, not all components of the example system are illustrated in FIG. 6B. A client (not shown) sends an instant access request to a metadata file manager (636) of the production host environment (630) to access a VM backup of VM A (632). The instant access request specifies mounting the VM backup on the production host environment (630).

The metadata file manager (636), in response to the instant access request, communicates with the client to determine configuration selections for the instant access. The configuration selection specifies implementing a one hour time limit for a VM that accesses the VM backup.

After obtaining the configuration selection, the metadata file manager (636) obtains relevant attributes from the backup metadata files (not shown) stored in the backup storage system (660) such as the storage location, file names, and file paths of the VM backup. The metadata file manager (636) determines, using the backup metadata files, that the VM backup is stored in VM A backup slices A-D (662, 664, 665, 668). The metadata file manager (636), after obtaining the relevant attributes, generates a VM A second virtual disk (638) that stores logical data blocks (640) that each map to a data block of one of the backup slices (662, 664, 665, 668). The data blocks may be accessed by the metadata file manager (636).

The metadata file manager (636) initiates generation of VM A (632) that reads from a VM A temporary virtual disk (634). VM A (632) sends read and/or write requests to the VM A temporary virtual disk (634). The metadata file manager (636), recognizing that the data is not stored in the production host environment (630), uses the second virtual disk (638) to service the read and/or write requests by finding the corresponding requested data in the backup storage system (660) and services the requested read request (e.g., by copying the data from the corresponding backup slice and providing it to VM A) or requested write request (e.g., by accessing the data in the backup storage system and writing the requested data).

End of Example 4

Figure 7A:
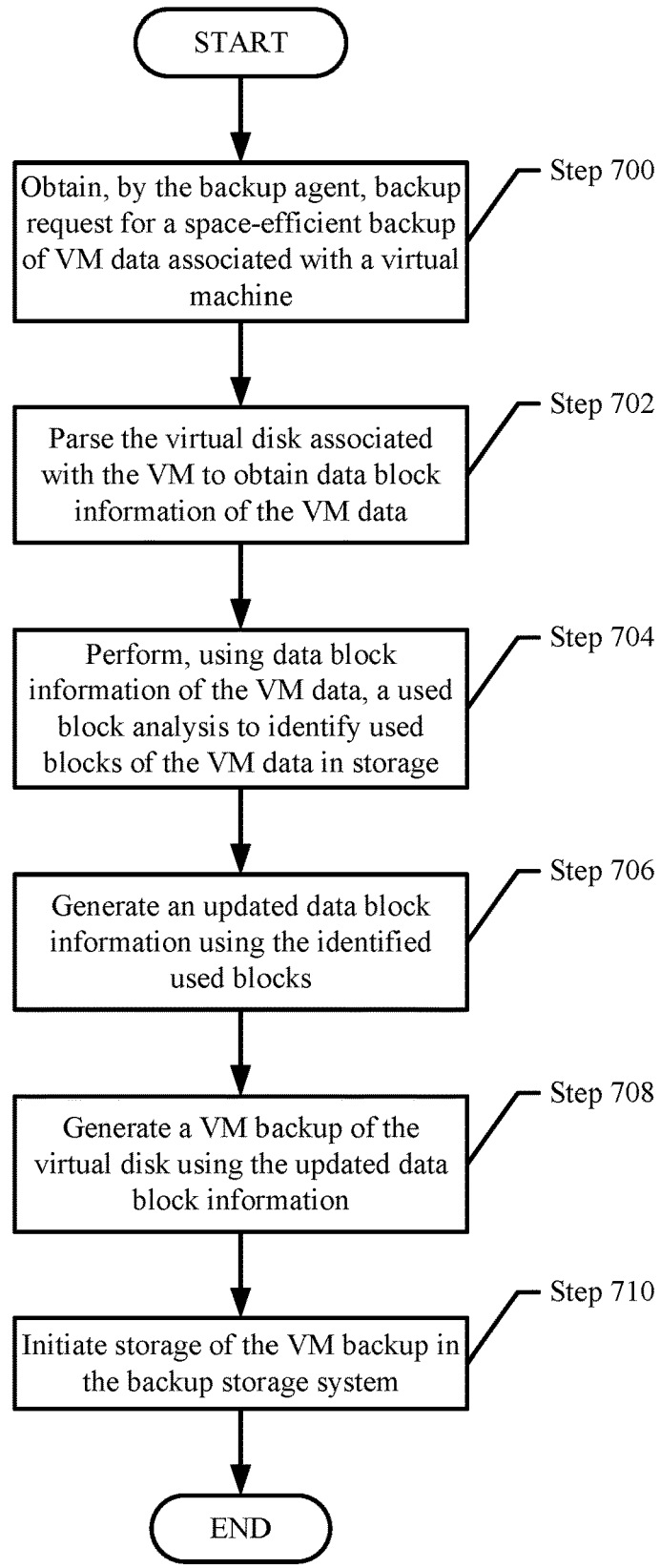
FIG. 7A shows a flowchart for generating and storing a space-efficient backup of a virtual machine in accordance with one or more embodiments of the invention.

FIG. 7A shows a flowchart for generating and storing a space-efficient backup of a virtual machine in accordance with one or more embodiments of the invention. The method shown in FIG. 7A may be performed by, for example, a backup agent (e.g., 100, FIG. 1). Other components of the system illustrated in FIG. 1 may perform the method of FIG. 7A without departing from the invention.

In step 700, a backup request for a space-efficient backup of VM data associated with a VM is obtained. In one or more embodiments, the backup request specifies generating and storing the space-efficient backup in a backup storage system. Further, the space-efficient backup is to not store any unused space of a virtual disk associated with the virtual machine.

In step 702, the virtual disk associated with the VM is parsed to obtain data block information of the VM data. In one or more embodiments, the data block information specifies each logical block associated with the virtual disk and identifying the corresponding data block(s) (if any) of the logical block. The identified data block(s) are tracked in the data block information.

In step 704, a used block analysis is performed using data block information of the VM data to identify used blocks of the VM data in storage. In one or more embodiments, the virtual disk is parsed by determining, for each logical block associated with the virtual disk, whether the logical block is reserved for the storage of data, whether the data corresponds to a file, and/or whether the data is otherwise not unused. In one or more embodiments, for those logical blocks that correspond to data blocks that are reserved for the storage of data, these logical blocks are included in the identified used blocks.

In step 706, updated data block information is generated using the identified used blocks. In one or more embodiments, the updated data block information includes removing the inclusion of any logical data blocks that are not one of the identified used blocks.

In step 708, a VM backup of the virtual disk is generated using the updated data block information. In one or more embodiments, the VM backup is generated by generating a copy of the data blocks corresponding to the specified used blocks in the updated data block information.

In step 710, storage of the VM backup in the backup storage system is initiated. In one or more embodiments, the VM backup is stored as backup slices, where each backup slice corresponds to a portion of the used blocks. The portion of the used blocks may be grouped based on the corresponding logical slices.

Figure 7B:
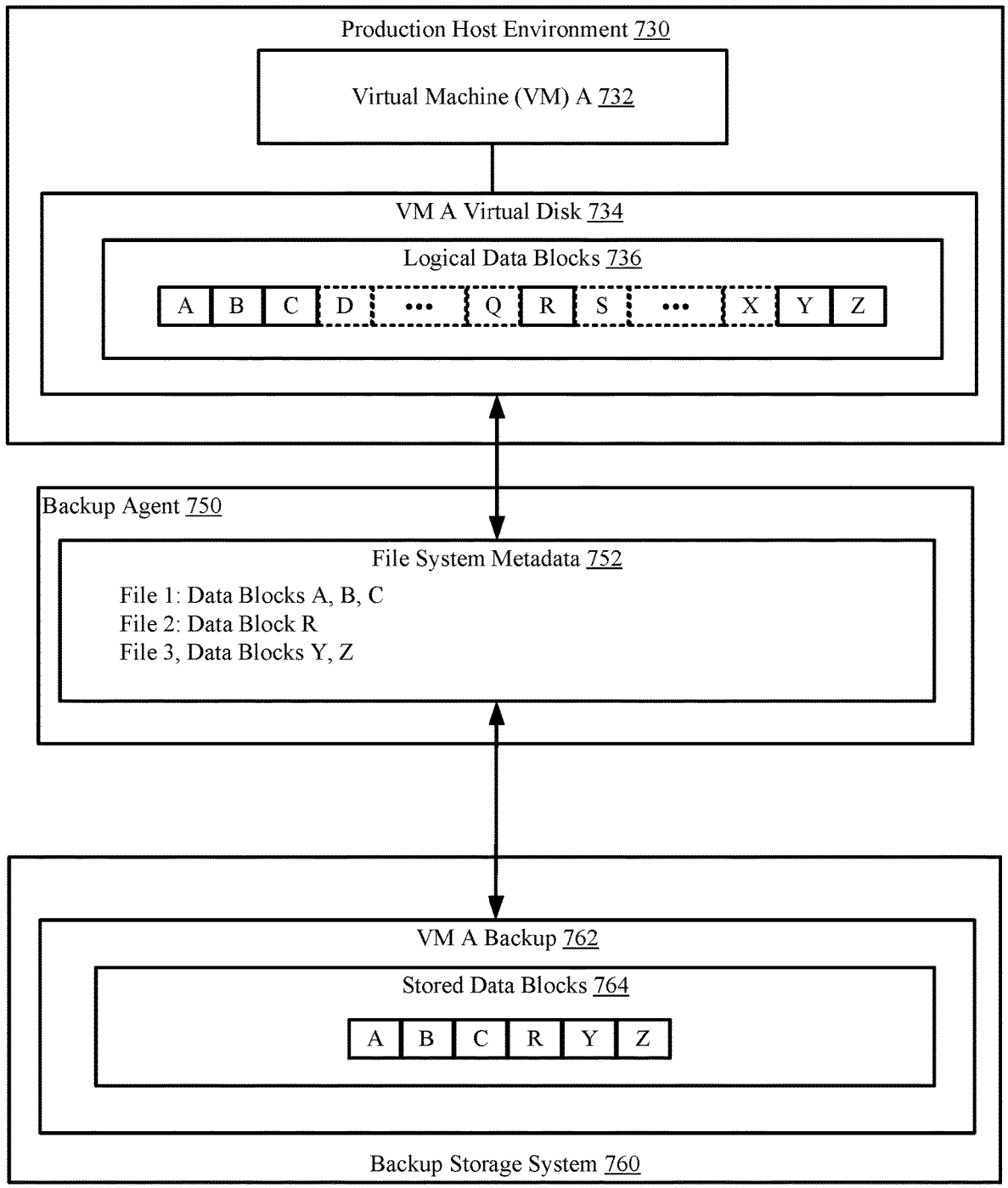
FIG. 7B shows a diagram of a fifth example in accordance with one or more embodiments of the invention.

The following section describes a fifth example illustrated using FIG. 7B. The fifth example may include embodiments described in FIG. 7A. Turning to the fifth example, consider a scenario in which a backup of a virtual machine is to be performed and stored in a backup storage system. The backup is specified to be a space-efficient backup.

Example 5

FIG. 7B shows a diagram of an example system. The example system includes the backup storage system (760), a backup agent (750) and a production host environment (730). For the sake of brevity, not all components of the example system are illustrated in FIG. 7B. A client (not shown) sends a backup request for performing a space-efficient backup of VM A (732). VM A (732) operates using a VM A virtual disk (734) that includes a set of logical blocks (736) labeled A-Z. For the sake of brevity, not all logical blocks of VM A virtual disk (736) are illustrated in FIG. 7B.

The backup agent (750), in response to the backup request, obtains file system metadata (752) associated with the virtual disk (734). The file system metadata (752) specifies all files of VM A virtual disk (736) and the corresponding data blocks. Using the file system metadata (752), the backup agent (750) performs the method of FIG. 7A to obtain updated block information that specifies only the data blocks used for the storage of data of the files in the file system metadata (752). In this example, only data blocks A, B, C, R, Y, and Z are associated with data of the file system. These data blocks correspond to logical blocks A, B, C, R, Y, and Z, respectively, of the VM A virtual disk (734).

After obtaining the updated data block information, the backup agent (750) initiates a backup of the VM A virtual disk (734) by copying the specified data blocks (i.e., data blocks A, B, C, R, Y, and Z) and transmitting these data blocks (764) to the backup storage system to be stored as VM A backup (762).

By using the updated data block information, the backup agent (750) does not store copies of other data blocks (e.g., D-Q or S-X) mapped in the virtual disk (736), as these blocks would take up unnecessary space in the backup storage system (760) and are not required for the restoration of VM A (732) using VM A backup (762).

End of Example 5

Figure 8A:
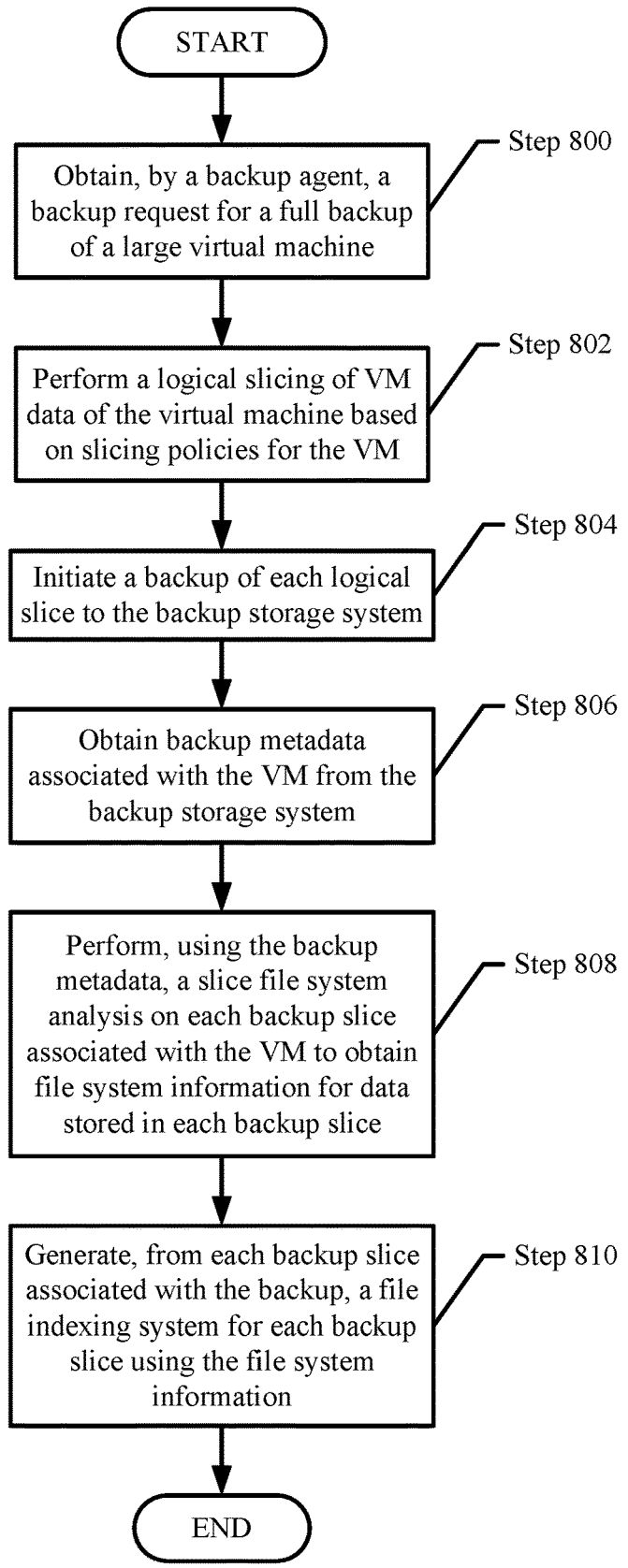
FIG. 8A shows a flowchart for performing an indexing of backup slices of a virtual machine in accordance with one or more embodiments of the invention.

FIG. 8A shows a flowchart for performing an indexing of backup slices of a virtual machine in accordance with one or more embodiments of the invention. The method shown in FIG. 8A may be performed by, for example, a backup agent (e.g., 100, FIG. 1). Other components of the system illustrated in FIG. 1 may perform the method of FIG. 8A without departing from the invention.

In step 800, a backup request for a full backup of a large VM is obtained. In one or more embodiments, the backup request is similar to a backup request discussed in FIGS. 3A, 3B, 4A, 5A, or 7A without departing from the invention.

In step 802, a logical slicing of VM data of the VM is performed. In one or more embodiments, the logical slicing performed in step 802 is similar to a logical slicing discussed in FIG. 3A without departing from the invention.

In step 804, a backup of each logical slice is initiated in the backup storage system. In one or more embodiments, the backup performed in step 804 is similar to a backup as discussed in FIGS. 3A, 3B, 4A, 5A, or 7A without departing from the invention.

In step 806, backup metadata associated with the VM is obtained from the backup storage system. In one or more embodiments, the backup metadata may be one or more VM backup metadata files discussed throughout this disclosure. In one or more embodiments, each of the VM backup metadata files corresponds to one of the backup slices of the VM backup.

In step 808, a slice file system analysis is performed on each backup slice using backup metadata. In one or more embodiments, the slice file system analysis includes determining, for each data block stored in the backup slice, the corresponding file of a file system. The file may be determined using the corresponding VM backup metadata. The result of a slice file system analysis is identification of all files associated with the corresponding backup slice.

In step 810, a file indexing system is generated from each backup slice using the file system information. In one or more embodiments, the file indexing system of a backup slice is an organization of all files, folders, and/or other directories stored in data of the backup slice. The file indexing system may be used for the search, identification, and/or access of the files by applications in the production host environment (or other entity).

Example 6

Figure 8B:
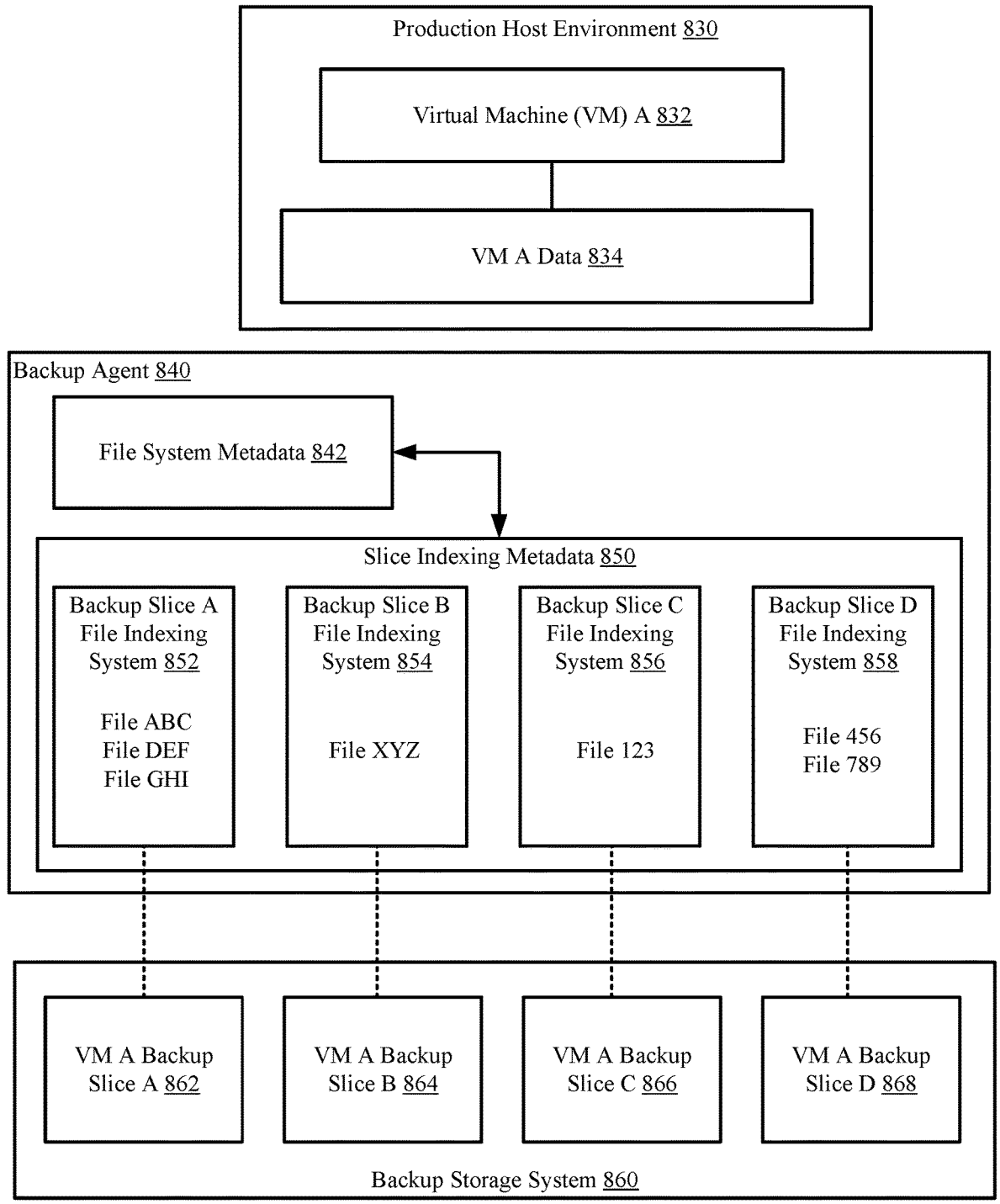
FIG. 8B shows a diagram of a sixth example in accordance with one or more embodiments of the invention.

The following section describes a sixth example illustrated using FIG. 8B. The sixth example may include embodiments described in FIG. 8A. Turning to the sixth example, consider a scenario in which a backup of a virtual machine is to be performed and stored in a backup storage system as backup slices. The backup slices are to be indexed based on the corresponding files stored by each backup slice.

FIG. 8B shows a diagram of an example system. The example system includes the backup storage system (860), a backup agent (840) and a production host environment (830). For the sake of brevity, not all components of the example system are illustrated in FIG. 8B. A client (not shown) sends a backup request for performing a backup of VM A (832). VM A (832) is associated with VM A data (834). The backup request may further specify generating a file indexing system for the data stored in the generated VM backup.

The backup agent (850), in response to the backup request, services the backup request in accordance with FIG. 8A. This results in VM A backup slices A-D (862, 864, 866, 868) being generated in the backup storage system (860).

After the generation of the backup slices (862, 864, 866, 868), the backup agent (850) obtains file system metadata (842) associated with a file system of the VM A data (834). The file system metadata (842) specifies the files in the file system and the corresponding data blocks in which the data is stored. The backup agent (840) performs the method of FIG. 8A to determine the backup slices (862, 864, 866, 868) of each data block. The determined backup slices may be used to generate a file indexing system for each backup slice. Backup slice A (862) is associated with backup slice A file indexing system (852) that specifies files ABC, DEF, and GHI being stored in backup slice A (862); backup slice B (864) is associated with backup slice B file indexing system (854) that specifies file XYZ being stored in backup slice B (864); backup slice C (866) is associated with backup slice C file indexing system (856) that specifies file 123 being stored in backup slice C (866); and backup slice D (868) is associated with backup slice D file indexing system (858) that specifies files 456 and 789 being stored in backup slice D (868).

The above backup slice file indexing systems (852, 854, 856, 858) may be used by the VM (832) (or another entity) of the example system for finding a file in the backup storage system (860).

End of Example 6

As discussed above, embodiments of the invention may be implemented using computing devices. FIG. 9 shows a diagram of a computing device in accordance with one or more embodiments of the invention. The computing device (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), input devices (910), output devices (908), and numerous other elements (not shown) and functionalities. Each of these components is described below.

In one embodiment of the invention, the computer processor(s) (902) may be an integrated circuit for processing instructions. For example, the computer processor(s) may be one or more cores or micro-cores of a processor. The computing device (900) may also include one or more input devices (910), such as a touchscreen, keyboard, mouse, microphone, touchpad, electronic pen, or any other type of input device. Further, the communication interface (912) may include an integrated circuit for connecting the computing device (900) to a network (not shown) (e.g., a local area network (LAN), a wide area network (WAN) such as the Internet, mobile network, or any other type of network) and/or to another device, such as another computing device.

In one embodiment of the invention, the computing device (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the operation of the storage and access of data for file systems stored in backups stored in a backup storage system. Embodiments of the invention provide a use of a virtual file system that is tailored to access data for a file based backup that is stored in a format that would otherwise make access to such data difficult.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing virtual machines (VMs), comprising:
    obtaining, by a backup agent, a backup request for a full backup of a VM;
    in response to the backup request:
        performing a logical slicing of VM data associated with the VM to obtain a set of logical slices;
        initiating generation of a backup of each logical slice in the set of logical slices to obtain a set of backup slices;
        storing the set of backup slices in a backup storage system;
    after storing the set of backup slices, obtaining backup metadata associated with the VM from the backup storage system;
    performing, using the backup metadata, a slice file system analysis on each backup slice of the set of backup slices associated with the VM to obtain file system information for a portion of the VM data stored in each backup slice of the set of backup slices; and
    generating, from each backup slice associated with the full backup, a file indexing system for each backup slice in the set of backup slices using the file system information,
    wherein the backup agent uses the file indexing system of a backup slice of the set of backup slices to service a search request for identifying a file in the backup slice.

2. The method of claim 1, wherein the VM data is larger than 200 gigabytes (GB).

3. The method of claim 1, wherein performing the logical slicing comprises partitioning the VM data into a number of the set of logical slices based on a slicing policy, and wherein the number is based on the size of the VM data.

4. The method of claim 1, wherein the slice file system analysis comprises:
    reading each block in a backup slice of the set of backup slices to determine a file associated with each block; and
    populating a first file indexing system based on the file.

5. The method of claim 4, wherein the first file indexing system comprises a portion of the file system information, wherein the portion of the file system information comprises the file.

6. The method of claim 1, wherein the backup metadata comprises a VM backup metadata file associated with one of the set of backup slices.

7. The method of claim 6, wherein the VM backup metadata file comprises a set of attributes associated with the portion of the VM data.

8. The method of claim 7, wherein one of the set of attributes is a storage location of a file of the VM data.

9. A non-transitory computer readable medium comprising computer readable program code, which when executed by a computer processor enables the computer processor to perform a method, the method comprising:
   obtaining, by a backup agent, a backup request for a full backup of a VM;
   in response to the backup request:
      performing a logical slicing of VM data associated with the VM to obtain a set of logical slices;
      initiating generation of a backup of each logical slice in the set of logical slices to obtain a set of backup slices;
      storing the set of backup slices in a backup storage system;
   after storing the set of backup slices, obtaining backup metadata associated with the VM from the backup storage system;
   performing, using the backup metadata, a slice file system analysis on each backup slice of the set of backup slices associated with the VM to obtain file system information for a portion of the VM data stored in each backup slice of the set of backup slices,
      wherein the slice file system analysis comprises: reading each block in a backup slice of the set of backup slices to determine a file associated with each block, and populating a first file indexing system based on the file; and generating, from each backup slice associated with the full backup, a file indexing system for each backup slice in the set of backup slices using the file system information.

10. The non-transitory computer readable medium of claim 9, wherein the VM data is larger than 200 gigabytes (GB).

11. The non-transitory computer readable medium of claim 9, wherein performing the logical slicing comprises partitioning the VM data into a number of the set of logical slices based on a slicing policy, and wherein the number is based on the size of the VM data.

12. The non-transitory computer readable medium of claim 9, wherein the backup agent uses the file indexing system of a backup slice of the set of backup slices to service a search request for identifying a file in the backup slice.

13. The non-transitory computer readable medium of claim 9, wherein the first file indexing system comprises a portion of the file system information, wherein the portion of the file system information comprises the file.

14. The non-transitory computer readable medium of claim 9, wherein the backup metadata comprises a VM backup metadata file associated with one of the set of backup slices.

15. The non-transitory computer readable medium of claim 14, wherein the VM backup metadata file comprises a set of attributes associated with the portion of the VM data.

16. The non-transitory computer readable medium of claim 15, wherein one of the set of attributes is a storage location of a file of the VM data.

17. A system, comprising:
   a processor; and
   memory comprising instructions, which when executed by the processor, perform a method, the method comprising:
      obtaining, by a backup agent, a backup request for a full backup of a VM;
      in response to the backup request:
         performing a logical slicing of VM data associated with the VM to obtain a set of logical slices;
         initiating generation of a backup of each logical slice in the set of logical slices to obtain a set of backup slices;
         storing the set of backup slices in a backup storage system;
      after storing the set of backup slices, obtaining backup metadata associated with the VM from the backup storage system;
      performing, using the backup metadata, a slice file system analysis on each backup slice of the set of backup slices associated with the VM to obtain file system information for a portion of VM data stored in each backup slice of the set of backup slices; and
      generating, from each backup slice associated with the full backup, a file indexing system for each backup slice in the set of backup slices using the file system information,
      wherein the backup agent uses the file indexing system of a backup slice of the set of backup slices to service a search request for identifying a file in the backup slice.

18. The system of claim 17, wherein the slice file system analysis comprises:
   reading each block in a backup slice of the set of backup slices to determine a file associated with each block; and
   populating a first file indexing system based on the file.

* * * * *